March 3, 1959
J. R. PIER
2,875,788
PULSATION DAMPENER DEVICE
Filed Feb. 27, 1956
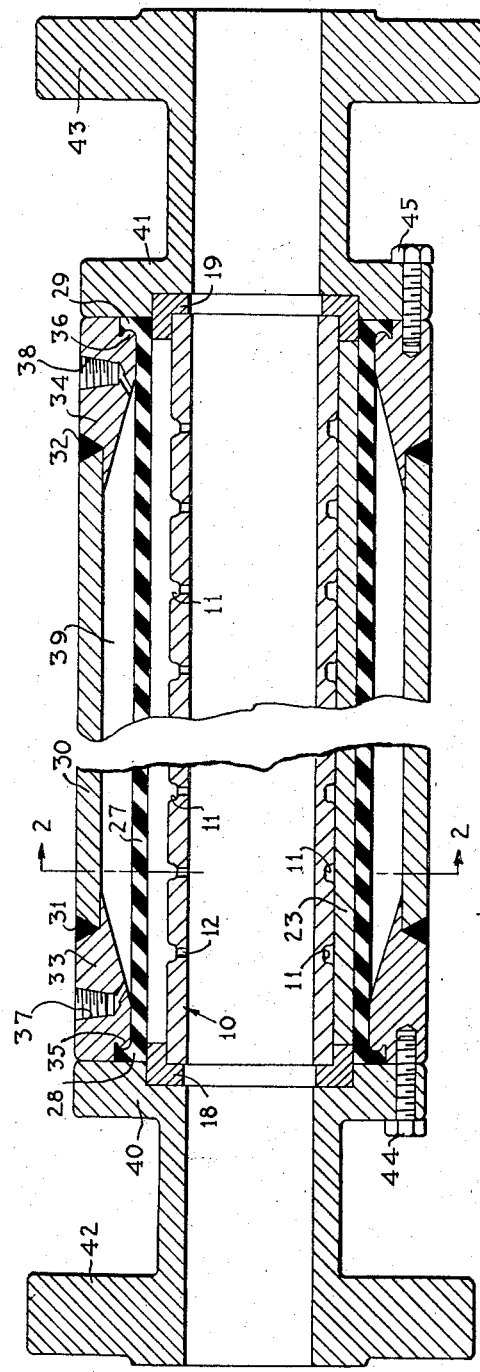
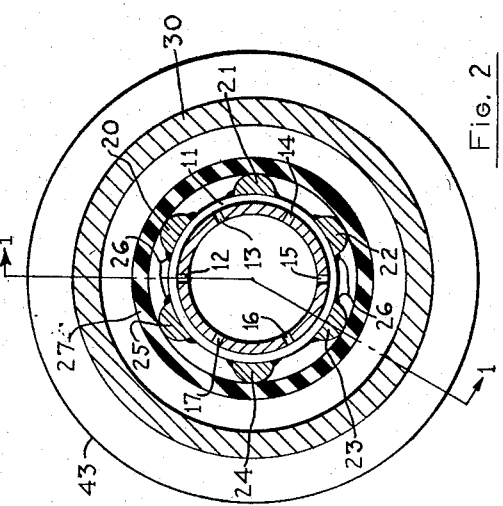
INVENTOR.
Jerome R. Pier
BY
*Adelbert A. Steinmiller*
AT TORNEY

United States Patent Office 2,875,788
Patented Mar. 3, 1959

2,875,788

PULSATION DAMPENER DEVICE

Jerome R. Pier, Irwin, Pa., assignor to Westinghouse Air Brake Company, Wilmerding, Pa., a corporation of Pennsylvania Application February 27, 1956, Serial No. 567,929

2 Claims. (Cl. 138—30)

This invention relates to devices for dampening, absorbing, or suppressing undesired pressure pulsations or surges in fluid streams, and more particularly to such devices of the type employing a mandrel and resilient means associated therewith and adapted to be connected in circuit with conduits or pipe lines carrying fluid subject to such pulsations or surges.

As is well known in the art to which the invention relates, pulsations and surges which the apparatus of the instant invention is designed to dampen and suppress originate in fluid systems in a number of ways. Reciprocating pumps have an output which is usually characterized by low cycle or low frequency surges of high volume or intensity. Centrifugal and rotary pumps may have in their fluid output low volume surges occurring at a high frequency. In addition to these periodic surges, shock waves may be generated in any fluid flow system where the fluid is subject to sudden deceleration, such for example as that caused by closing a valve against the moving column of fluid. The closing of such a valve may result in the generation of surges or shock waves of high intensity, which may result in damage to pipe lines and undesirable noises frequently known as "water hammer."

It is old in the art to suppress and dampen these surges or shock waves by connecting in the fluid line a mandrel or section of pipe having therein a number of perforations or throttling orifices, this mandrel or perforated section of pipe being surrounded by a resilient sleeve of rubber or other suitable resilient material. Sudden increases of pressure in the fluid in the line cause the fluid to flow through the orifices or perforations into the space between the sleeve and the pipe section or mandrel, changing the position of the sleeve or enlarging the volume between the sleeve and mandrel, thereby taking up or absorbing the excess pressure. When the pressure in the line returns to normal, the fluid between the sleeve and the mandrel or pipe section is discharged through the orifices or perforations back into the line. In some prior art devices the resilient sleeve itself is surrounded by a chamber of resilient material, such for example, as air under pressure, to insure the rapid collapse of the sleeve or return to its former position, and discharge of fluid back into the line, when the line pressure falls to normal or below after the surge has passed. It has been found that the useful life of resilient sleeves in such devices is limited by the wear resulting from contact and friction between the sleeve and pipe section, particularly when the sleeve collapses against the pipe section and also to some extent when the sleeve is distended by fluid pressure in the line and may make contact with the walls of the surrounding chamber. Furthermore, the sleeve may be stretched beyond its limit of elasticity by the fluid intake during the surge, so that the sleeve does not return to normal or its former position when the pressure decreases, and with the result that undesired stresses and strains occur in the material of which the sleeve is made, reducing its effectiveness as a surge absorbing element, and possibly resulting in its ultimate rupture. Also, sharp folds in the sleeve may occur when it collapses after the surge has passed, or the edges of the throttling orifices may cut the sleeve.

The apparatus of the subject invention is adapted to reduce to a minimum damage to the resilient sleeve of the before-named varieties by providing an arrangement in which a substantial change in the volume between the sleeve and mandrel can occur without excessive stretching of the sleeve, and also to provide an arrangement in which frictional contact between the sleeve and mandrel is reduced to a minimum. Means is provided for preventing the occurrence of sharp folds in the sleeve when the sleeve collapses against the mandrel. These advantages of the instant invention are obtained by providing mandrel means including a perforated pipe section having a plurality of circular indentations or annular grooves therein and a plurality of throttling orifices in the wall thereof, the orifices opening into the grooves. The orifices are arranged in rows extending substantially along the length of the pipe section, and there are disposed between the rows of orifices rods which are preferably of semi-circular cross section and which support the resilient sleeve in a normal position where the sleeve is not making contact with the pipe section. When the sleeve is pressed inward during rarefactions it bends around the curved outsides of the aforementioned rods. After the surges and rarefactions have passed and the sleeve returns to its normal shape and size, it makes contact with the rods only on the rounded tops thereof, thereby reducing the effects of friction on the sleeve.

Accordingly, it is a primary object of this invention to provide new and improved surge absorbing and pulsation dampening apparatus characterized by long and trouble-free life.

Another object is to provide surge absorbing and pulsation dampening apparatus characterized by substantially constant high efficiency over its entire lifetime.

Another object is to provide new and improved surge absorbing apparatus of the type employing a resilient sleeve in which wear of the sleeve is reduced to a minimum.

Another object is to provide new and improved surge absorbing apparatus of the type employing a resilient sleeve supported by a mandrel in which sharp folds in the sleeve are prevented from occurring as the sleeve contracts.

Still another object is to provide new and improved surge absorbing apparatus of the type employing a resilient sleeve supported by a mandrel in which the volume between the sleeve and mandrel may vary within wide limits without excessive stretching of the sleeve.

A further object is to provide a new and improved mandrel utilizing a perforated pipe section with spaced annular grooves therein, for use in surge absorbing apparatus of the type employing a resilient sleeve supported by a mandrel.

Other objects and advantages will become apparent after a perusal of the following specification when studied in connection with the accompanying drawings, in which:

Fig. 1 is a sectional view of the preferred embodiment, taken in two planes substantially parallel to the longitudinal axis of the apparatus and intersecting at the longitudinal axis in the manner shown by the broken line 1—1 in Fig. 2.

Fig. 2 is a cross-sectional view taken along the line 2—2 of Fig. 1; and

Fig. 3 is a detailed view of the manner in which the rods for supporting the sleeve are attached to the perforated pipe section in one embodiment of the invention.

Referring now to the drawings for a more detailed understanding of the invention, and in which like reference characters are used throughout to designate like parts, there is shown a perforated pipe section or mandrel generally designated by the reference numeral 10 and having a plurality of circular indentations or annular grooves 11 at spaced intervals along the lenght thereof. The wall of the pipe section has therein six rows of throttling orifices 12, 13, 14, 15, 16 and 17, Fig. 2, the orifices opening into the circular indentations or annular grooves. Disposed on the two ends of the perforated pipe section 10 are two cup members 18 and 19 respectively, which are provided for reasons to be hereinafter more clearly apparent. Disposed on the outside of the perforated pipe section 10 are six rods 20, 21, 22, 23, 24, and 25, the rods being disposed between the rows of throttling orifices, the rods being substantially semi-circular in cross section and secured in predetermined positions on the outside of the pipe section by welding at intervals along the length thereof in a plurality of spots, as at 26, Fig. 3. Preferably but not necessarily the rods are of such dimensions or diameter that their radial height above the outer surface of the perforated pipe section corresponds to the radial height of the aforementioned cups 18 and 19.

Disposed around the cups 18 and 19 and the aforementioned rods 20, 21, 22, 23, 24 and 25 is a resilient sleeve 27 having flanged end portions 28 and 29. The cup members 18 and 19 firmly support the ends of the sleeve 27 around its entire inner periphery and provide for the use of a sealing arrangement hereinafter described.

Disposed around the resilient sleeve 27 is a housing member 30 which is preferably cylindrical in shape and which is welded at 31 and 32 to two end pieces or end sections 33 and 34 respectively, the end sections having overhanging lips 35 and 36 respectively engaging and compressing the flanged ends 28 and 29 of the resilient sleeve 27. The aforementioned end portions 33 and 34 have threaded bores 37 and 38 therein respectively, the bore 37 being adapted to be connected to a pressure gauge (not shown), and the bore 38 being connected by way of a valve (not shown) and a pipe (not shown) to a source of other fluid under pressure (not shown), for example, compressed air. The compressed air is admitted to the chamber 39 formed between housing or cylinder 30 and sleeve 27 for providing means for applying a pressure inwardly on the sleeve 27 to assist the sleeve in opposing the flow of fluid into the volume between the sleeve 27 and the perforated pipe section 10 resulting from increases of pressure in the fluid in the pipe line to which the apparatus is connected, and also to assist the sleeve 27 in discharging fluid back into the line after the surge of pressure has passed.

Disposed adjacent the end portions 33 and 34 are coupling members 40 and 41 respectively having coupling flanges 42 and 43 respectively. Members 40 and 41, together with cups 18 and 19 respectively, and lips 35 and 36 respectively pressing against the ends of the sleeve 27, seal the apparatus against leakage of either the line fluid or the fluid in chamber 39. The coupling flanges 42 and 43 are adapted to be connected to the line which is carrying the fluid from which surfaces are to be removed. The coupling members 40 and 41 are firmly connected to their respective end portions 33 and 34 by bolts spaced around the periphery thereof, two of the bolts being shown at 44 and 45.

Whereas the invention has for convenience of illustration been shown in an embodiment in which the apparatus is adapted to be connected in the line so that all the line fluid flows through the apparatus, it is to be understood that one end of the apparatus of Fig. 1 could be closed if desired, and the other end connected to the fluid line by, for example, a T-joint.

Whereas six rods and six rows of throttling orifices are shown, it is to be understood that any convenient number could be employed.

Whereas the end cup members 18 and 19 have been shown, it is to be understood that other means providing a close sealing connection to the ends 28 and 29 of sleeve 27 could be employed, for example, the pipe section 10 might itself have outwardly flanged end portions which would support the ends 28 and 29 of the resilient sleeve 27.

Whereas the invention has been shown with respect to an embodiment in which circular orifices are used, it is to be understood that orifices having other shapes could be used if desired. The invention is not to be limited to orifices of any particular area, and the invention is not to be limited to apparatus in which any particular ratio exists between the total area of the throttling orifices and the inside area of the pipe section itself.

In summary, in the operation of the above-described apparatus, pulses of pressure in the line to which the apparatus is connected cause fluid to flow through the rows of orifices 12, 13, 14, 15, 16 and 17 into the volume between the pipe section 10 and the sleeve 27, expanding the sleeve 27 against the pressure in chamber 39. During the rarefactions which follow the peaks in pressure the compressed air in chamber 39 and the sleeve 27 force the fluid back through rows of orifices 12, 13, 14, 15, 16 and 17 into the line, and the sleeve may be forced down into the valleys between the semi-circular rods. In that event the sleeve will lie against the curved surfaces of the rods and sharp creases and folds in the sleeve will be avoided, thereby enhancing the useful life of the sleeve 27 and the value of the apparatus as a whole. The annular grooves 11 prevent the sleeve 27 from making contact with the edges of the throttling orifices.

Having now described the invention, what I claim as new and desire to secure by Letters Patent, is:

1. Pulsation dempening apparatus for use with a conduit carrying fluid under variable pressure, comprising, in combination, a pipe section for connecting to said conduit, said pipe section having a plurality of annular grooves at spaced intervals along the length thereof, said pipe section having a plurality of rows of throtting orifices in the wall thereof, said orifices opening into said annular grooves, a plurality of rods disposed on the outside of said pipe section and spaced at predetermined positions around the periphery of the pipe section, means for securing said rods on said pipe section at said positions, resilient sleeve means substantially surrounding said pipe section and rods and normally supported by said rods, and housing means substantially surrounding said sleeve means and cooperating therewith in sealed relation to provide a chamber into which other fluid under pressure is introduced for applying pressure to the outside of said resilient sleeve means.

2. Pulsation dampening and surge absorbing apparatus for use with a conduit carrying a fluid under variable pressure comprising in combination, a tubular mandrel connectable to the conduit, casing means, resilient sleeve means surrounding said mandrel and sealingly secured adjacent its respective ends between said casing means and said mandrel, said mandrel having a series of annular grooves in the outer surface thereof located in spaced relation along the length thereof, a plurality of throttling orifices in the wall of said mandrel opening into the bottom of each of said grooves, and a plurality of rods extending longitudinally of the entire length of the mandrel and secured in peripherally spaced relation on the outside surface of the mandrel for so supporting said resilient sleeve in normal radial outwardly spaced relation from said mandrel as to define longitudinal spaces between each of said rods, said spaces being constantly open to the variable pressure in the conduit via the throttling orifices and to each other by way of the annular grooves such that the pressure of fluid from said conduit will be distributed equally to all of said spaces and to the inner surface of said sleeve.

References Cited in the file of this patent

UNITED STATES PATENTS

| | | |
|---|---|---|
| 2,278,688 | Caminez | Apr. 7, 1942 |
| 2,448,118 | Pellettere | Aug. 31, 1948 |
| 2,583,231 | Ragland | Jan. 22, 1952 |
| 2,609,001 | Hebard | Sept. 2, 1952 |
| 2,712,831 | Day | July 12, 1955 |
| 2,760,518 | Peet | Aug. 28, 1956 |

FOREIGN PATENTS

| | | |
|---|---|---|
| 598,012 | Great Britain | Feb. 9, 1948 |